(12) United States Patent
Straubel et al.

(10) Patent No.: US 7,671,565 B2
(45) Date of Patent: Mar. 2, 2010

(54) BATTERY PACK AND METHOD FOR PROTECTING BATTERIES

(75) Inventors: Jeffrey B Straubel, Menlo Park, CA (US); David Lyons, Palo Alto, CA (US); Eugene Berdichevsky, Palo Alto, CA (US); Scott Kohn, Menlo Park, CA (US); Ryan Teixeira, Dublin, CA (US)

(73) Assignee: Tesla Motors, Inc., San Carlos, CA (US)

( * ) Notice: Subject to any disclaimer, the term of this patent is extended or adjusted under 35 U.S.C. 154(b) by 54 days.

(21) Appl. No.: 11/353,648

(22) Filed: Feb. 13, 2006

(65) Prior Publication Data
US 2007/0188147 A1      Aug. 16, 2007

(51) Int. Cl.
*H02J 7/00* (2006.01)
(52) U.S. Cl. .................. 320/134; 307/10.7; 320/136; 361/93.1
(58) Field of Classification Search .................. 320/104, 320/127, 134, 135, 136, 116, 124, 126; 307/10.7; 439/500; 429/96
See application file for complete search history.

(56) References Cited

U.S. PATENT DOCUMENTS

| | | | |
|---|---|---|---|
| 5,444,378 A * | 8/1995 | Rogers | 324/428 |
| 5,900,332 A * | 5/1999 | Marukawa et al. | 429/158 |
| 6,331,763 B1 * | 12/2001 | Thomas et al. | 320/136 |
| 6,399,238 B1 | 6/2002 | Oweis et al. | |
| 6,773,301 B1 * | 8/2004 | Chaskin | 439/500 |
| 7,208,816 B2 * | 4/2007 | Kawakami et al. | 257/666 |
| 2002/0022159 A1 * | 2/2002 | Pierson et al. | 429/1 |
| 2002/0086578 A1 * | 7/2002 | Ikeda | 439/500 |

OTHER PUBLICATIONS

International Search Report, Aug. 26, 2008, 3 pages.
Written Opinion of the International Searching Authority, Aug. 26, 2008, 3 pages.

* cited by examiner

*Primary Examiner*—Patrick J Assouad
*Assistant Examiner*—Arun Williams
(74) *Attorney, Agent, or Firm*—Innovation Partners; Charles E. Gotlieb

(57) ABSTRACT

A system and method links batteries in parallel to conductors using wire bonds that act as fuses in the event of an overcurrent condition in a battery. To protect the wire bonds in the case of a larger overcurrent condition, a fuse may be added in series to the parallel batteries.

15 Claims, 2 Drawing Sheets

BATTERY PACK AND METHOD FOR PROTECTING BATTERIES

RELATED APPLICATIONS

The subject matter of this application is related to the subject matter of applcation Ser. No. 11/129,118 entitled, "Method and Apparatus for Mounting, Cooling, Connecting and Protecting Batteries" filed on May 12, 2005 by Jeffrey B. Straubel, Eugene Berdichevsky, David Lyons, Thomas Colson, Martin Eberhard, Ian Wright and Robert Ferber having the same assignee as this application and is hereby incorporated herein by reference in its entirety.

FIELD OF THE INVENTION

The present invention is related to rechargeable battery systems for energy-conserving electric and hybrid automobiles and more specifically to systems for interconnecting batteries.

BACKGROUND OF THE INVENTION

Multiple conventional rechargeable batteries such as Lithium-ion or Nickel metal hydride batteries may be arranged in series or parallel to obtain any desired voltage or current. For example, a set of batteries may be arranged in parallel by sandwiching the batteries between two conductors to obtain a desired current. Many of the parallel sets may be coupled in series to obtain a desired voltage of the larger set. The larger set may be electrically coupled in series or parallel with other similarly sized sets to obtain an even higher voltage or current.

The related application describes one method of managing the electrical connections in the smaller sets of batteries, in which multiple batteries are sandwiched in parallel between two conductors. That application describes a bracket which is laid into holes in the conductor and wave soldered to the conductor. The holes are aligned over the end terminals of the batteries, and the bracket is then welded to the batteries.

However, there are problems with this approach. The welding process is time consuming and prone to failure. It is also difficult to test the connection between each battery and the conductors. Another problem with this approach is the lack of electrical protection. A single battery can internally short, due to a malfunction or damage. The short can thus make unusable the entire set of batteries to which it is connected in parallel.

In addition, a short circuit between any two of: a conductor in the smaller set or the interconnections between the smaller sets or the larger sets, can short circuit some or all of the batteries.

Because rechargeable batteries can overheat and explode when short circuited, a short circuit can be catastrophic, not only to the batteries being shorted, but to the other batteries as well, because these non-shorted batteries can be overheated to the point at which they will overheat and explode. Because batteries can overheat and explode as a result of a short circuit, a major short circuit can cause the failure of one or more of the smaller sets of batteries.

It can be desirable to ensure that any solution to this problem ensure that short circuits external to the batteries are easy to repair.

What is needed is a system and method of interconnecting batteries that can help prevent a short circuit from causing the batteries to overheat, does not require welding the batteries to a bracket, and can allow the connections between the batteries and the conductors to be tested, and can prevent the failure of any of the smaller sets of batteries in the event of a short circuit internal to each of one or more of the batteries or a short circuit external to the batteries.

SUMMARY OF INVENTION

A system and method uses conventional wire bonding techniques to wire bond the batteries to the conductors. The wire bonds are constructed of wire that allows for the expected current to pass through the wire bonds without significant heating of the wires due to the current, while allowing the wires bonds to break in an overcurrent condition, such as would be expected during a short circuit. In an overcurrent condition, the wires will break sufficiently to ensure that no arcing will occur at the voltage expected in a worst case short, such as a short between the first conductor and the last conductor in the series of smaller sets. A conventional fuse is inserted in series with the sets of batteries that have series connections between the sets. The conventional fuse will blow at a smaller current than the sum of the wire bonds in each set, to help ensure that the fuse will blow before the wire bonds in the event of an external short circuit, making it easy to repair this condition by replacing a single fuse, rather than requiring repair of all of the wire bonds or replacement of all the sets.

DETAILED DESCRIPTION OF A PREFERRED EMBODIMENT

Figure 1A:
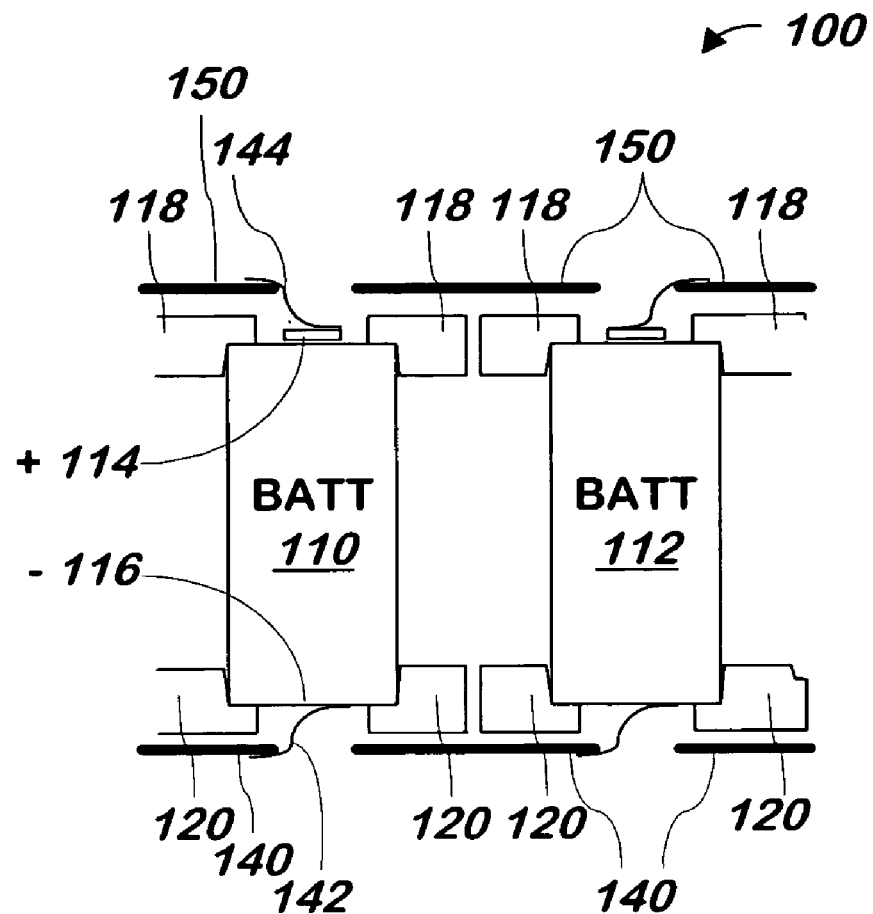
FIG. 1A is a side view of a portion of a battery pack according to one embodiment of the present invention.

FIG. 1A is a side view of a portion of battery pack 100 according to one embodiment of the present invention. Referring now to FIG. 1A, batteries 110 and 112 are conventional rechargeable batteries such as Lithium-ion or Nickel metal hydride batteries. Substrate 118 and substrate 120, in which the batteries are mounted, are described in the related application. Conductor 150 and conductor 140 are sheets of hole-punched copper layered over the substrates 118, 120, with holes in each conductor aligned over the ends of each battery. Substrates 118 and 120 serve to hold the batteries and prevent the batteries' positive and negative terminals from touching conductors 150 and 140, respectively.

The batteries' positive terminals 114 are connected to conductor 150 by fusible links, such as wire bonds 144, and the batteries' negative ends 116 are connected to conductor 140 by similar fusible links, such as wire bonds 142 via holes in the substrates 118, 120 and conductors 140, 150. These wire bonds are one method of fusibly linking each battery to each conductor, and are described herein as a representative example; other methods of fusibly linking each battery to each conductor may be used in other embodiments. In one embodiment, each wire bond is a wire 15 mils thick, made substantially of Aluminum. The wire bond is made of an aluminum allow containing 50 parts per million of nickel for corrosion resistance and one-half of one percent of magnesium for added strength. The batteries are conventional.

The current carrying capacity of wire bonds 144 and 142 is slightly greater than the maximum expected current from one battery. In the event that the current carrying capacity is exceeded, the wire bond for that battery will break sufficiently to ensure that no arcing will occur, preventing the current from flowing between the battery 110 or 112 and the conductor 140, 150, and allowing the rest of the batteries in the pack to continue to function in the event of an overcurrent condition, such as a short circuit through the battery.

Figure 1B:
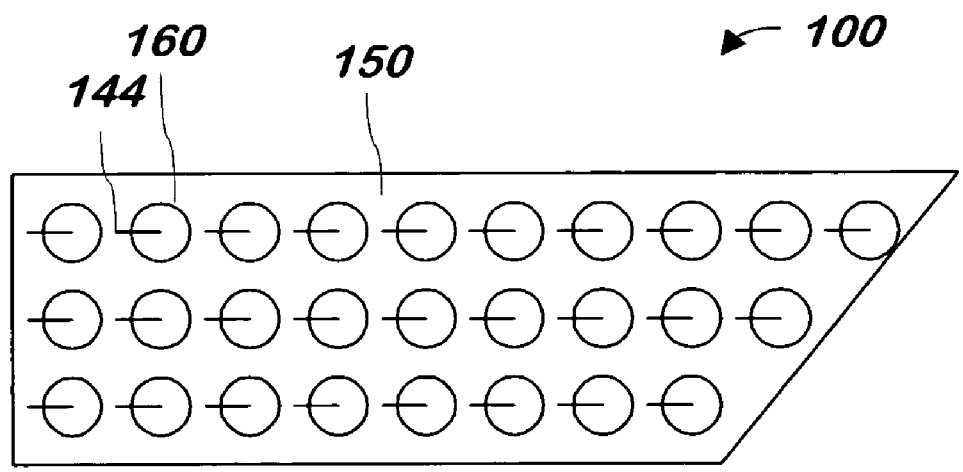
FIG. 1B is a top view of the battery pack of FIG. 1A according to one embodiment of the present invention.

FIG. 1B is a top view of the battery pack 100 of FIG. 1A according to one embodiment of the present invention. Referring now to FIG. 1B, wire bonds 144 are connected in parallel to conductor 150 via holes 160 in the conductor 150 and underlying substrate (not shown). Conductor 150 may be cut to any shape to fit the arrangement of batteries in the available space.

Figure 2:
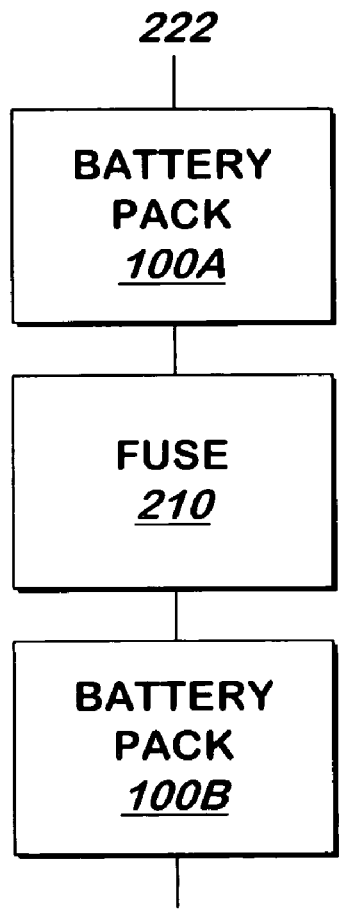
FIG. 2 is a block schematic diagram of a set of two battery packs and a fuse according to one embodiment of the present invention.

FIG. 2 is a block schematic diagram of a set of two battery packs and a fuse according to one embodiment of the present invention. Referring now to FIG. 2, each battery pack 100A, 100B is constructed in the same or similar manner as battery pack 100 as described with reference to FIGS. 1A and 1B. Fuse 210 connects the conductor that is wire bonded to the positive ends of the batteries in battery pack 100A to the conductor that is wire bonded to the negative ends of the batteries in battery pack 100B.

The current carrying capacity of fuse 210 is just below the current carrying capacity of the sum of the wire bonds coupled to one conductor, or just above the maximum expected current through all the batteries in each pack 100A, 100B. In the event that the current carrying capacity of fuse 210 is exceeded, fuse 210 will blow, preventing the current from blowing out the wire bonds in the battery packs 100A, 100B, for example, in the event that a short occurs between terminals 220 and 222.

Although fuse 210 is shown in this embodiment between the battery packs, in other embodiments it may be placed elsewhere, such as in front of, or behind, the series of battery packs 100A, 100B. Any number of battery packs 100A, 100B may be fusibly connected, in serial, in this manner. Terminals 220 and 222 end the chain of battery packs and the fuse 210.

One or two or more of battery packs 100A, 100B with the fuse 210 may be added to a conventional hybrid or electric vehicle, such as an automobile or rocket to manufacture such a vehicle. Other products may be manufactured using one or more such battery packs, with or without fuse 210.

Figure 3:
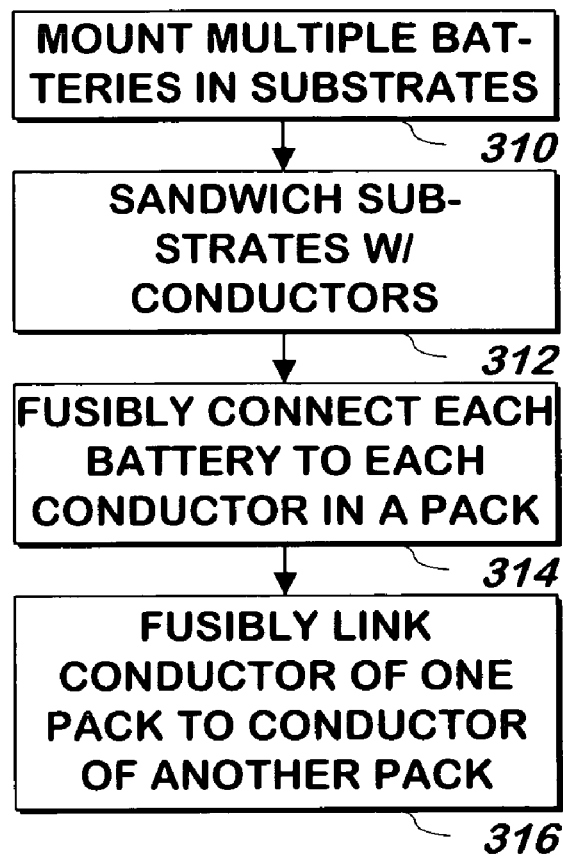
FIG. 3 is a flowchart illustrating a method of fusibly coupling batteries according to one embodiment of the present invention.

FIG. 3 is a flowchart illustrating a method of fusibly coupling batteries according to one embodiment of the present invention. Referring now to FIG. 3, multiple batteries are mounted in substrates 310. The positive ends of the batteries are mounted in one substrate and the negative ends of the batteries are mounted in a second substrate, as described above. The substrates are described in detail in a related application.

Each substrate is layered with a conductor 312. Each conductor is placed on the side of the substrate that does not touch the batteries, so that the batteries and substrates are sandwiched between two conductors, as described above. As previously described, the conductors are sheets of copper that contain holes, and each hole is aligned over one end of one battery.

When the substrates have been sandwiched with conductors, the positive ends of each battery are fusibly linked to one conductor, and the negative ends of each battery are fusibly linked to the other conductor 314. As previously described, in one embodiment, the fusible links are wire bonds that run through the holes in a substrate and conductor.

When each battery has been fusibly linked to each conductor, the battery pack is complete. As described above, two or more battery packs may be connected. In one embodiment, to connect two battery packs, the packs and a fuse are connected in series as described above 316. Any number of battery packs and fuses may be serially connected in this manner. As used herein, a battery pack is a set of one, two, or more batteries in which some or all of the terminals of one polarity are connected to one conductor and some or all of the terminals of the other polarity are connected to another conductor.

What is claimed is:

1. A method of protecting a plurality of batteries, comprising:
   providing a plurality of conductors, each comprising a plurality of holes;
   providing a first plurality of batteries, each of the batteries in the first plurality comprising a first terminal and a second terminal; and
   for each of the plurality of batteries, coupling the first terminal of said battery to a first of the plurality of conductors via a fusible link that physically runs through one of the plurality of holes in the first of the plurality of conductors.

2. The method of claim 1:
   wherein each fusible link is capable of:
   carrying an expected current from the battery to which the fusible link is coupled and the first of the plurality of conductors; and
   eliminating the coupling between the first of the plurality of conductors and the respective battery to which it is coupled in the event that a higher than anticipated current flows through the battery of the plurality of batteries to which it is coupled; and
   the method additionally comprising coupling the second polarity of each of the plurality of batteries to a second of the plurality of conductors.

3. The method of claim 1, additionally comprising coupling in series the first plurality of batteries to a second plurality of batteries and a fuse capable of:
   carrying an expected current of all of the batteries in the first plurality; and
   eliminating a current of the batteries in the first set if said current exceeds the expected current by at least a threshold.

4. The method of claim 1, wherein:
   the fusible link comprises a wire bond; and
   the coupling step comprises wire bonding the first polarity of each of the first plurality of batteries to a first of the plurality of conductors.

5. The method of claim 4 wherein the wire bond comprises aluminum.

6. The method of claim 5, wherein the wire bond additionally comprises at least one selected from nickel and magnesium.

7. A battery pack produced by the process of claim 1.

8. An automobile produced by the process of claim 1.

9. A vehicle produced by the process of claim 1.

10. A battery pack comprising:
    a plurality of conductors, each conductor comprising a plurality of holes;
    a plurality of batteries, each of the batteries in the plurality comprising at least two terminals; and
    a plurality of fusible links, each fusible link coupled between at least one of the plurality of conductors and at least one of the terminals of at least one of the batteries via the fusible link that physically runs through at least one of the plurality of holes of the conductors.

11. The battery pack of claim 10, wherein each of the plurality of fusible links is capable of:
- carrying an expected current between the at least one battery to which the fusible link is coupled and the at least one conductor to which the fusible link is coupled; and
- eliminating the coupling between the at least one battery to which the fusible link is coupled and the at least one conductor to which the fusible link is coupled in the event that a higher than anticipated current flows through the at least one battery to which said fusible link is coupled.

12. The battery pack of claim 10 coupled in series to at least one fuse.

13. The battery pack of claim 10, wherein the fusible link comprises a wire bond.

14. The battery pack of claim 13 wherein the wire bond comprises aluminum.

15. The battery pack of claim 14, wherein the wire bond additionally comprises at least one selected from nickel and magnesium.

* * * * *